UNITED STATES PATENT OFFICE.

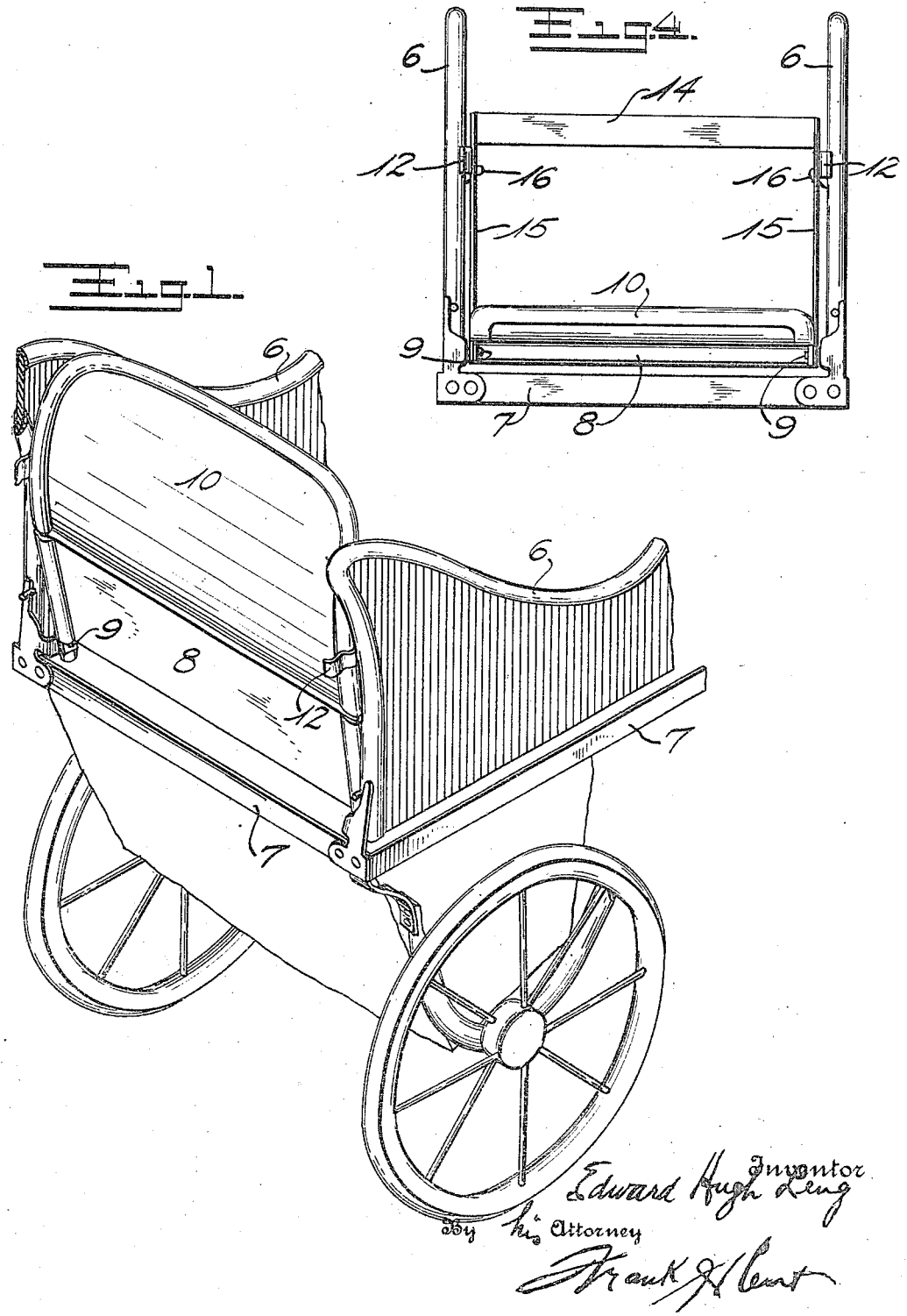

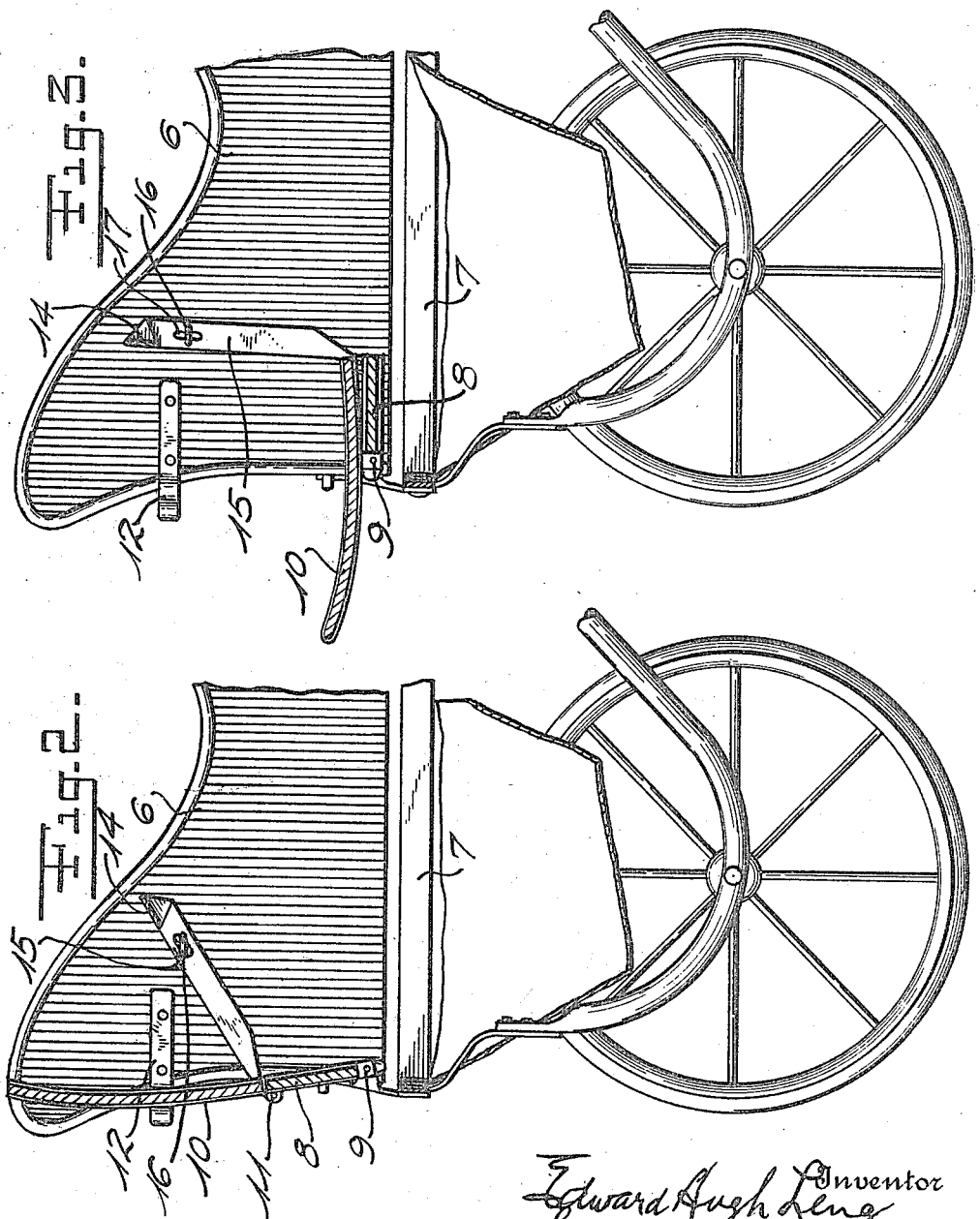

EDWARD H. LENG, OF MONTCLAIR, NEW JERSEY.

COLLAPSIBLE GO-CART.

1,268,856.  Specification of Letters Patent.  Patented June 11, 1918.

Application filed December 14, 1916. Serial No. 136,834.

*To all whom it may concern:*

Be it known that I, EDWARD HUGH LENG, a citizen of the United States, residing at Montclair, in the county of Essex and State of New Jersey, have invented certain new and useful Improvements in Collapsible Go-Carts, of which the following is a specification.

This invention relates to improvements in vehicles, as for instance, children's carriages or go-carts.

One of the objects of the invention is to provide an improved construction of the front portion of such vehicles whereby the capacity of the vehicle may be increased at the option of the user, substantially without increasing the overall dimensions, without complication of parts or any considerable increase in cost of manufacture.

Other objects and aims of the invention, more or less broad than those stated above, together with the advantages inherent, will be in part obvious and in part specifically referred to in the course of the following description of the elements, combinations, arrangements of parts, and applications of principles constituting the invention; and the scope of protection contemplated will appear from the claims.

In the accompanying drawings, which are to be taken as a part of this specification, and in which I have shown a merely preferred form of embodiment of the invention, Figure 1 is a perspective view of the forward part of a vehicle, here illustrated as a carriage for children; Fig. 2 is a view partly in section and partly in elevation, taken on a median line longitudinally of such a carriage and showing the dash or front wall of the vehicle body in its usual position; Fig. 3 is a view similar to Fig. 2, but showing the dash in position to serve as an auxiliary seat at the front end of the body; and Fig. 4 is a detail view in front elevation of the body of the vehicle, illustrating substantially the subject-matter and positions of parts indicated in Fig. 3.

Referring to the numerals on the drawings, there are shown at 6 the side walls of a vehicle body, which are here illustrated as secured to a member 7, which may be merely a frame or may take the form of a floor for the vehicle body. The front wall or dash of the vehicle body is shown in Fig. 1, extending upwardly from the member 7 and between the side walls 6. This dash according to my invention comprises a lower section 8 pivoted at its lower end either to the frame or floor 7 or to the side walls 6 as by means of pivots 9; and an upper dash section 10 pivoted to the upper edge of the lower dash section 8 as by means of pivots 11. Normally these dash sections 8 and 10 are in the positions illustrated in Figs. 1 and 2, so that together they form the dash or front wall of the vehicle body. The pivot or hinge 11 permits of relative pivotal movement between the dash sections only in the direction toward the left in Fig. 2, and the Fig. 2 position is maintained by means of spring clips 12 or the like secured on the inner faces of the side walls 6, said clips 12 engaging the vertical edges of the upper dash section 10.

When desired, the dash sections may be brought to the position shown in Figs. 3 and 4, that is to say, the upper dash section 10 is released from its engagement with the clips 12, the lower dash section 8 is moved on its pivots back into the body of the vehicle between the side walls 6 to the position shown in Fig. 3, while the upper dash section 10 is moved on its pivots 11 until it lies flat on the lower dash section 8 and assumes the position of Figs. 3 and 4, when it will serve as an auxiliary seat. These seats so constituted will be partly within the body of the vehicle, between the side walls 6, and the projection of the seat beyond the forward end of the vehicle body will of course be very much less than it would be if the dash were in one piece and if such a one piece dash were moved on pivots to project forwardly of the vehicle body. Furthermore, by reason of the fact that the seat is partly within the vehicle body, between the side walls thereof, the child occupying this seat has the benefit of the security afforded by the adjacent side walls 6. Furthermore, I propose to provide a back rest, indicated in Fig. 4 and comprising a back rest proper or cross piece 14 and legs 15 integral therewith or secured thereto, said legs 15 being pivoted at their lower ends to one of the dash sections 8 or 10 adjacent the line of the pivots 11. When the dash sections are disposed to constitute a seat, as in Figs. 3 and 4, this back rest is rotated to position as shown in those figures, and is held in such position by some fastening means. In the drawings I have shown ordinary turn buttons 16 on the inner faces of the side walls 6, said turn buttons passing through appropriate openings 17 in the legs 15, these legs 15 as well as the back rest 14 proper may conveniently be made of a single length of strap iron or the like suitably bent to shape. The back rest thus described serves also the function of a brace between the side walls 6 of the vehicle body.

Inasmuch as many changes could be made in the above construction, and many apparently widely different embodiments of my invention could be made without departing from the scope thereof, it is intended that all matter contained in the above description or shown in the accompanying drawings shall be interpreted as illustrative and not in a limiting sense.

It is also to be understood that the language used in the following claims is intended to cover all the generic and specific features of the invention herein described and all statements of the scope of the invention which, as a matter of language, might be said to fall therebetween.

I claim:

1. In combination with the side walls of a vehicle body, a front wall or dash extending therebetween and comprising a lower dash section having a fixed pivot between the side walls and an upper dash section pivoted to said lower dash section, said lower dash section adapted to be turned to lie flat between the side walls and the upper section to lie flat upon the lower section, whereby is constituted a seat extending partly between the side walls.

2. In combination with the side walls of a vehicle body, a front wall or dash extending therebetween and comprising a lower dash section having a fixed pivot between the side walls and an upper dash section pivoted to said lower dash section, said lower dash section adapted to be turned to lie flat between the side walls and the upper section to lie flat upon the lower section, whereby is constituted a seat extending partly between the side walls and a back rest comprising a cross piece and depending legs pivoted to the front wall adjacent the pivotal connection between the dash sections.

3. In combination with the side walls of a vehicle body, a front wall or dash extending therebetween and comprising a lower dash section having a fixed pivot between the side walls and an upper dash section pivoted to said lower dash section, said lower dash section adapted to be turned to lie flat between the side walls and the upper section to lie flat upon the lower section, whereby is constituted a seat extending partly between the side walls and a back rest comprising a cross piece and depending legs pivoted to the front wall adjacent the pivotal connection between the dash sections, the legs of the back rest closely overlying the faces of the side walls, and means for holding the legs in a given position.

4. In combination with the side walls of a vehicle body, a dash member at the front of the vehicle body movable to two positions, in one of which positions it is substantially vertical at the front of the vehicle body, and in the other of which it is substantially horizontal and disposed between the side walls partly within and partly without the vehicle body.

5. In combination with the side walls of a vehicle body, a dash member at the front of the vehicle body movable to two positions, in one of which positions it is substantially vertical at the front of the vehicle body, and in the other of which it is substantially horizontal and disposed between the side walls partly within and partly without the vehicle body, and a back-rest member comprising a cross-piece, and depending legs connected to the dash member, and means for holding the back-rest member in pivotal relation to the side walls.

6. In combination with the side walls of a vehicle body, a front wall or dash member movable to two positions, in one of which it is substantially vertical at the front of the vehicle body, and in the other of which it is substantially horizontal and disposed partly within and partly without the vehicle body, said dash member being connected to the vehicle body by means of a bodily movable pivot.

7. In combination with the side walls of a vehicle body, a front wall or dash member movable to two positions, in one of which it is substantially vertical at the front of the vehicle, and in the other of which it is substantially horizontal and disposed partly within and partly without the vehicle body, said dash member being connected to the vehicle body by means of a bodily movable pivot, and a pivoted member by which said pivot is carried, the member being pivoted to the body.

8. In combination with the side walls of a vehicle body, a dash member at the front of the vehicle body movable to two positions, in one of which positions it is substantially vertical at the front of the vehicle body, and in the other of which it is substantially horizontal and disposed between the side walls partly within and partly without the vehicle body, and means arranged to sustain the dash in either of its two adjusted positions.

9. In combination with the side walls of a vehicle body, a dash member at the front of the vehicle body movable to two positions, in one of which positions it is substantially vertical at the front of the vehicle body, and in the other of which it is substantially horizontal and disposed between the side walls partly within and partly without the vehicle body, and means arranged to sustain the dash in its substantially horizontal position.

10. In combination with the side walls of a vehicle body, a dash member at the front of the vehicle body movable to two positions, in one of which positions it is substantially vertical at the front of the vehicle body, and in the other of which it is substantially horizontal and disposed between the side walls partly within and partly without the vehicle body, and means associated with the sides and arranged to sustain the dash in its substantially horizontal position.

11. In combination with the side walls of a vehicle body, a dash member transversely pivoted between said sides, a portion of said dash being movable to the rear of said pivot and means arranged to coact with said portion to sustain the dash member in substantially horizontal position.

12. In combination with the side walls of a vehicle body, a dash member transversely pivoted between said sides, a portion of said dash being movable to the rear of said pivot and means associated with the sides behind said pivot and arranged to coact with said portion to sustain the dash member in substantially a horizontal position.

13. In combination with the side walls of a vehicle body, a dash member transversely pivoted between said sides, a portion of said dash being movable to the rear of said pivot, and a cross frame pivotally supported between said sides and connected to said portion and arranged to swing to form a back rest when the dash portion is moved rearwardly.

14. In combination with the side walls of a vehicle body, a dash member transversely pivoted between said sides, a portion of said dash being movable to the rear of said pivot, and a pivotally supported cross frame connected to said dash member and arranged to form a back rest when the dash member is horizontally adjusted.

15. In combination with the side walls of a vehicle body, a dash member transversely pivoted between said sides, a portion of said dash being movable to the rear of said pivot, a pivotally supported cross frame connected to said dash member and arranged to form a back rest when the dash member is horizontally adjusted and means associated with the cross frame to hold the parts in this latter position.

16. In combination with the side walls of a vehicle body, a dash member at the front of the vehicle body movable to two positions, in one of which positions it is substantially vertical at the front of the vehicle body, and in the other of which it is substantially horizontal and disposed between the side walls partly within and partly without the vehicle body and a cross frame pivotally supported between said sides and connected to said dash, said cross frame arranged to swing into back rest position when the dash is moved to horizontal position.

17. In combination with the side walls of a vehicle body, a dash member transversely pivoted between said sides and arranged to be swung into seat forming position, and a pivotally supported cross frame connected to said dash member and adapted to form a back rest when the said member is moved into seat forming position.

In testimony whereof I affix my signature.

EDWARD H. LENG.

Copies of this patent may be obtained for five cents each, by addressing the "Commissioner of Patents, Washington, D. C."